(12) United States Patent
Schemitsch

(10) Patent No.: US 8,516,134 B2
(45) Date of Patent: Aug. 20, 2013

(54) UNCONNECTED CONNECTIVITY ANALYSIS

(75) Inventor: Richard R. Schemitsch, Raleigh, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 361 days.

(21) Appl. No.: 12/915,503

(22) Filed: Oct. 29, 2010

(65) Prior Publication Data

US 2012/0110195 A1 May 3, 2012

(51) Int. Cl.
*G06F 15/16* (2006.01)
(52) U.S. Cl.
USPC .......................... 709/228; 709/232; 709/244
(58) Field of Classification Search
USPC ............... 709/228, 220, 223, 225, 231–232, 709/238–244
See application file for complete search history.

(56) References Cited

U.S. PATENT DOCUMENTS

| | | | | |
|---|---|---|---|---|
| 6,108,702 A * | 8/2000 | Wood | | 709/224 |
| 6,915,309 B1 * | 7/2005 | Conley et al. | | 1/1 |
| 7,035,934 B1 * | 4/2006 | Lin | | 709/238 |
| 7,185,072 B2 * | 2/2007 | Hada et al. | | 709/220 |
| 2004/0233859 A1 * | 11/2004 | Martin | | 370/254 |

OTHER PUBLICATIONS

Sustainable Softworks, Net Masks and the Subnet Calculator, 2003, Sustainable Softworks, http://www.sustworks.com/site/prod_ipr_subnets.html.*
Rich Schemitsch, "Netchk Plus" System Documentation, 3 pages.
Rich Schemitsch, "Netchk v2.2", MCI®, © Copyright 2003, 17 pages.

* cited by examiner

*Primary Examiner* — Ruolei Zong

(57) ABSTRACT

A computing device retrieves a set of configuration files of devices associated with a network, and extracts, from the set of configuration files, Internet protocol (IP) address information to form an IP address database. The computing device also extracts, from the set of configuration files, border gateway protocol (BGP) routing protocols to form a BGP routing database. The computing device analyzes the IP address database and the BGP routing database to determine network connection information for each of the devices associated with the network and generates an output file that includes the network connection information for each of the devices associated with the network. The device connectivity information is determined without establishing a connection between the computing device and the devices associated with the network.

20 Claims, 10 Drawing Sheets

FIG. 4

| HOSTNAME | INTERFACE | IP ADDRESS | MASK |
|---|---|---|---|
| ashburn-gk1 | Loopback0 | 10.xxx.255.7 | /32 |
| ashburn-gk1 | Gigabit Ethernet0/0 | 172.xx.162.25 | /24 |
| ashburn-wan-rtr2 | Gigabit Ethernet0/1 | 10.xxx.255.77 | /30 |
| chespotrtr0001 | Multilink10134 | 10.xxx.101.34 | /30 |
| chespotrtr0201 | Multilink10158 | 10.xxx.101.58 | /30 |
| chespotrtr0701 | Gigabit Ethernet0/0.3 | 10.xxx.64.1 | /22 |

FIG. 5

| HOSTNAME | BGP LOCAL ASN | NEIGHBOR IP ADDRESS | REMOTE ASN |
|---|---|---|---|
| charndcrtr0001 | 65081 | 10.xxx.101.9 | 13979 |
| charsscrtr0001 | 65082 | 10.xxx.101.21 | 13979 |
| chespotrtr0001 | 65042 | 10.xxx.101.33 | 13979 |
| chespotrtr0201 | 65043 | 10.xxx.101.57 | 13979 |
| nhqsndcrtr0501 | 7152 | 172.xx.1.9 | 797 |
| nocalifrtr0001 | 65131 | 10.xxx.242.2 | 13979 |

| HOSTNAME | INTERFACE | IP ADDRESS | MASK | REMOTE_HOST1 | REMOTE_INTERFACE1 | REMOTEIP1 | ... |
|---|---|---|---|---|---|---|---|
| ashburn-gk1 | Loopback0 | 10.xxx.255.7 | /32 | SELF | SELF | SELF | |
| ashburn-gk1 | Gigabit Ethernet0/0 | 172.xx.162.25 | /24 | ashburn-core-esw2 | Vlan200 | 172.xx.162.2 | |
| ashburn-wan-rtr2 | Gigabit Ethernet0/1 | 10.xxx.255.77 | /30 | ashburn-core-esw2 | Gigabit Ethernet5/8 | 10.xxx.255.78 | |
| chespotrtr0001 | Multilink10134 | 10.xxx.101.34 | /30 | ATTWAN | CARRIER PE INT | 10.xxx.101.33 | |
| chespotrtr0201 | Multilink10158 | 10.xxx.101.58 | /30 | ATTWAN | CARRIER PE INT | 10.xxx.101.57 | |
| chespotrtr0701 | Gigabit Ethernet0/0.3 | 10.xxx.64.1 | /22 | | | | |

410 420 430 440 610 620 630 640 680 650 660 670 690

600

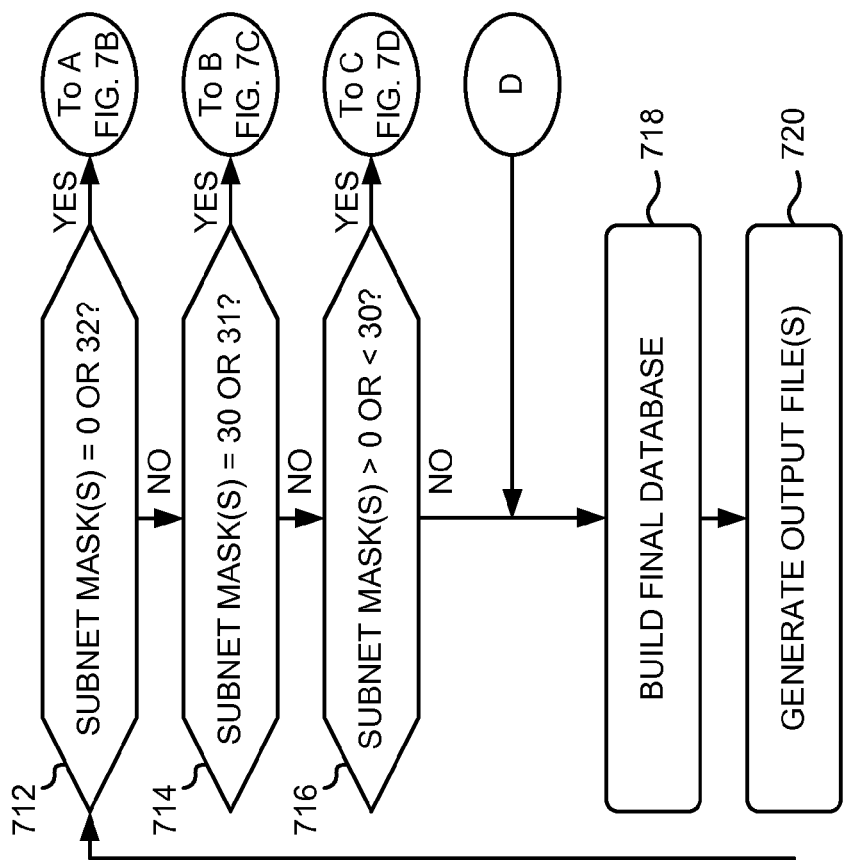
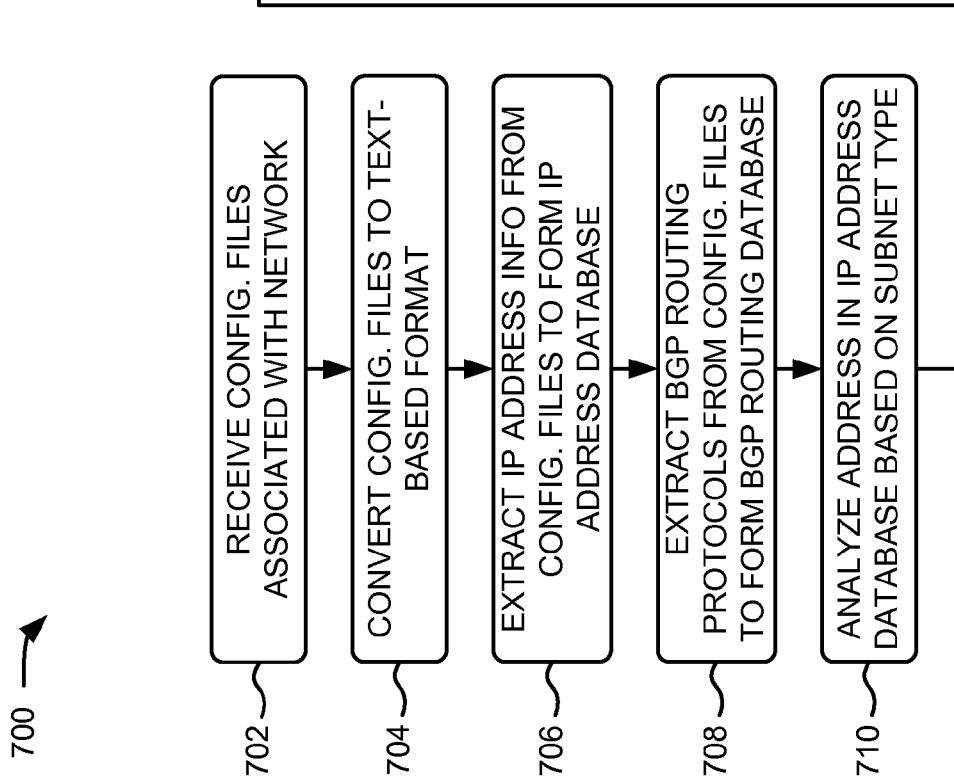
FIG. 7A

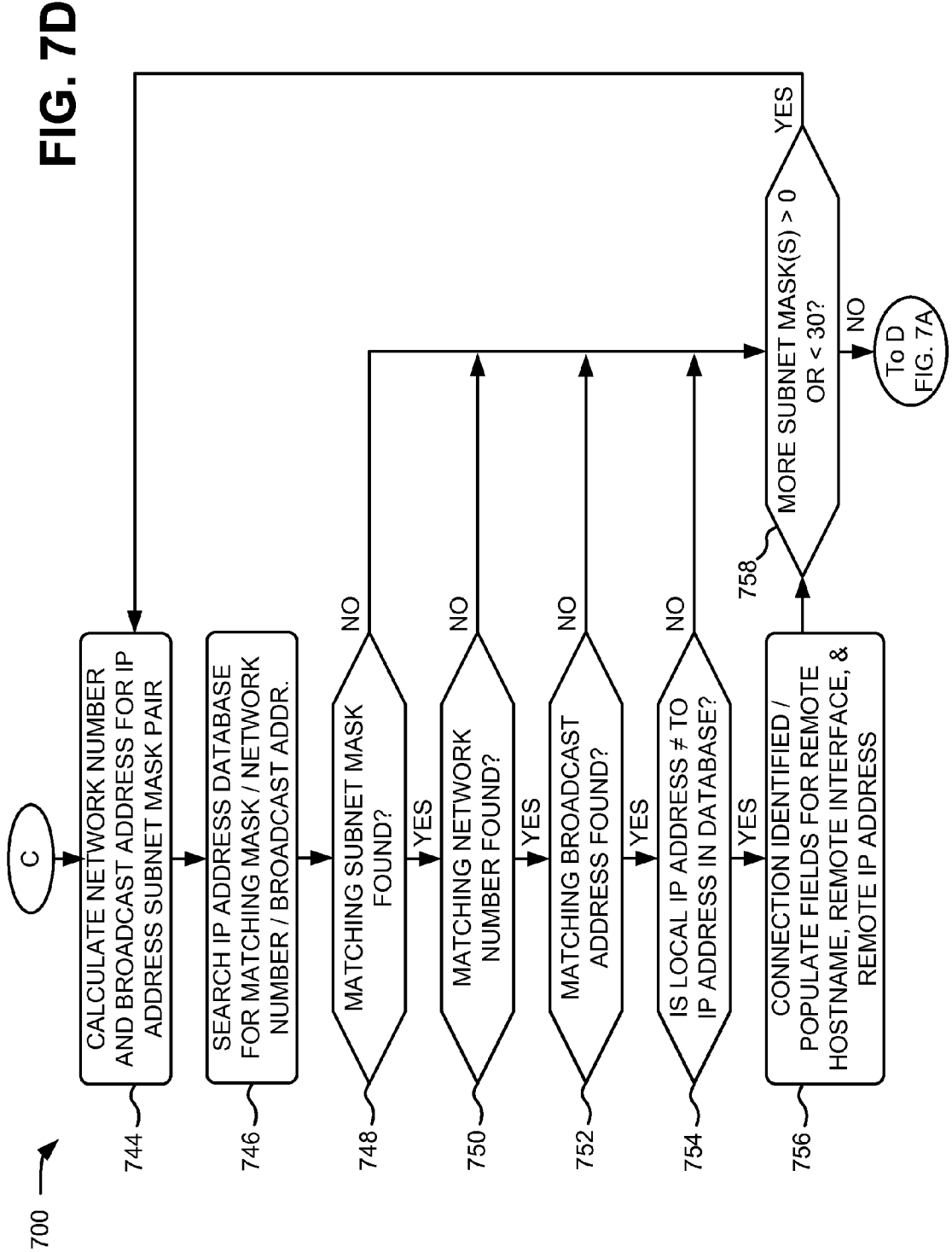

UNCONNECTED CONNECTIVITY ANALYSIS

BACKGROUND

In a network environment, there may be a large number of network devices (e.g., switches, routers, security devices, etc.). Without accurate information regarding a network environment, it can be challenging to perform any type of network administration. Device discovery may be used to determine an inventory of devices associated with a network, and various protocols may be used to facilitate the network discovery process. These protocols typically generate a high volume of network traffic which may be disruptive to other network operations.

BRIEF DESCRIPTION OF THE DRAWINGS

FIG. 4 is a diagram of an example data structure that may be generated by an Internet protocol (IP) address extractor of FIG. 3;

FIG. 5 is a diagram of an example data structure that may be generated by a border gateway protocol (BGP) routing protocol extractor of FIG. 3;

FIG. 6 is a diagram of an example supplemented data structure that may be generated by an address analyzer of FIG. 3; and FIGS. 7A-7D are flow diagrams illustrating an example process for performing connectivity analysis according to an implementation described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a network analysis tool that creates network documentation based on configuration files from devices within a network to be analyzed. The systems and/or methods may provide a network overview (e.g., of local area network (LAN) and/or wide area network (WAN) device connectivity) without actually connecting to the analyzed network. The systems and/or methods may identify legacy and advanced network features such as voice-over-IP (VoIP), Internet protocol (IP) Multicast, and virtual routing and forwarding (VRF)-Lite, which typically influence circuit orders and Layer 3 provisioning. The systems and/or methods herein may, thus, provide a non-intrusive method for reviewing undocumented networks and may provide connectivity documentation of the network.

In one implementation, the systems and/or methods may retrieve a set of configuration files of devices associated with a network to be analyzed, and may extract, from the set of configuration files, IP address information and BGP routing protocols to form one or more data structures. The systems and/or methods may analyze the data structures to determine network connection information for each of the devices associated with the network and may generate an output file including the network connection information for each of the devices associated with the network. The network connection information may thus be determined without establishing a connection between a device performing the analysis and the devices associated with the network.

Figure 1:
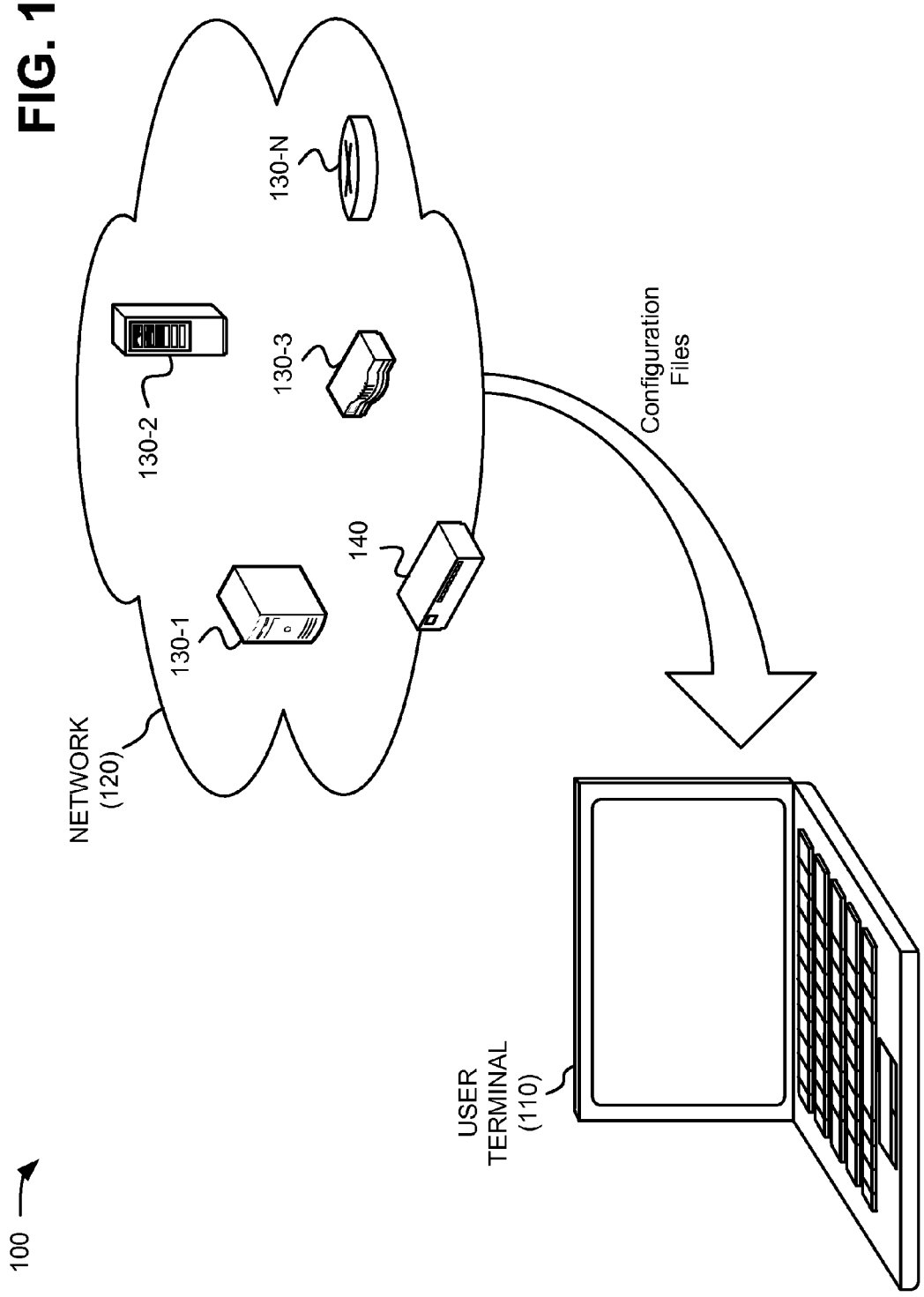
FIG. 1 is a diagram illustrating an example environment in which concepts described herein may be implemented.

FIG. 1 is a diagram illustrating an example environment 100 in which concepts described herein may be implemented. As illustrated, environment 100 may include a user terminal 110 and a network 120. Network 120 may include multiple devices 130-1, 130-2, 130-3, ..., 130-N (referred to herein collectively as "devices 130" or generically as "device 130") and a network manager 140. One user terminal 110 and one network 120 have been illustrated in FIG. 1 for simplicity. In practice, there may be more user terminals 110 and/or networks 120.

User terminal 110 may include a computational device. For example, user terminal 110 may include a laptop computer, a personal computer, a tablet computer, a workstation, or another type of computation or communication device. In one implementation, user terminal 110 may generate IP network topology based on an analysis of configuration files from a particular network (e.g., network 120). User terminal 110 may receive the configuration files from network 120 through a manual transfer, a wired or wireless network connection, or another file transfer mechanism. Once the configuration files are received, user terminal 110 may analyze the configuration files independent of any connection with network 120.

Network 120 may include a network for which IP network topology and connectivity analysis is desired. Network 120 may include for example, a LAN or a WAN, a private network, or a combination of networks. Network 120 may include various devices 130. Devices 130 of network 120 may interconnect via wired and/or wireless connections.

Devices 130 may each include a device having communication capability. For example, devices 130 may each include a router, a bridge, a switch, a gateway, a computer, a security device (e.g., a firewall), and/or some other type of network device. Devices 130 may include various interfaces and/or support various protocols. For purposes of illustration, device 130-1 may correspond to a computer, device 130-2 may correspond to a server, device 130-3 may correspond to a router, and device 130-N may correspond to a switch. Each of devices 130 may include one or more device configuration files (e.g., files used to configure initial settings for applications running on a device 130).

Network manager 140 may include a device having communication capability. For example, network manager 140 may include a computer, a router, a bridge, a switch, a gateway, and/or some other type of computation or communication device. Network manager 140 may perform various operations associated with device discovery and management. In one implementation, network manager 140 may automatically retrieve configuration files from devices 130 and provide the configuration files to user terminal 110 (e.g., over a wired or wireless interface).

In an implementation described herein, user terminal 110 may receive device configuration files for each of devices 130 within network 120. The device configuration files may be stored within a memory associated with (or accessible by) user terminal 110. User terminal 110 may analyze the configuration files to identify network connectivity of each device 130 identified in the configuration files. User terminal 110 may calculate connectivity (e.g., IP addresses) and may perform a search to verify each calculated address. Results of the connectivity analysis may be presented to users in a variety of sortable formats. Furthermore, user terminal 110 may present a graphical representation of network connectivity.

Although FIG. 1 shows example components of environment 100, in other implementations, environment 100 may include fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
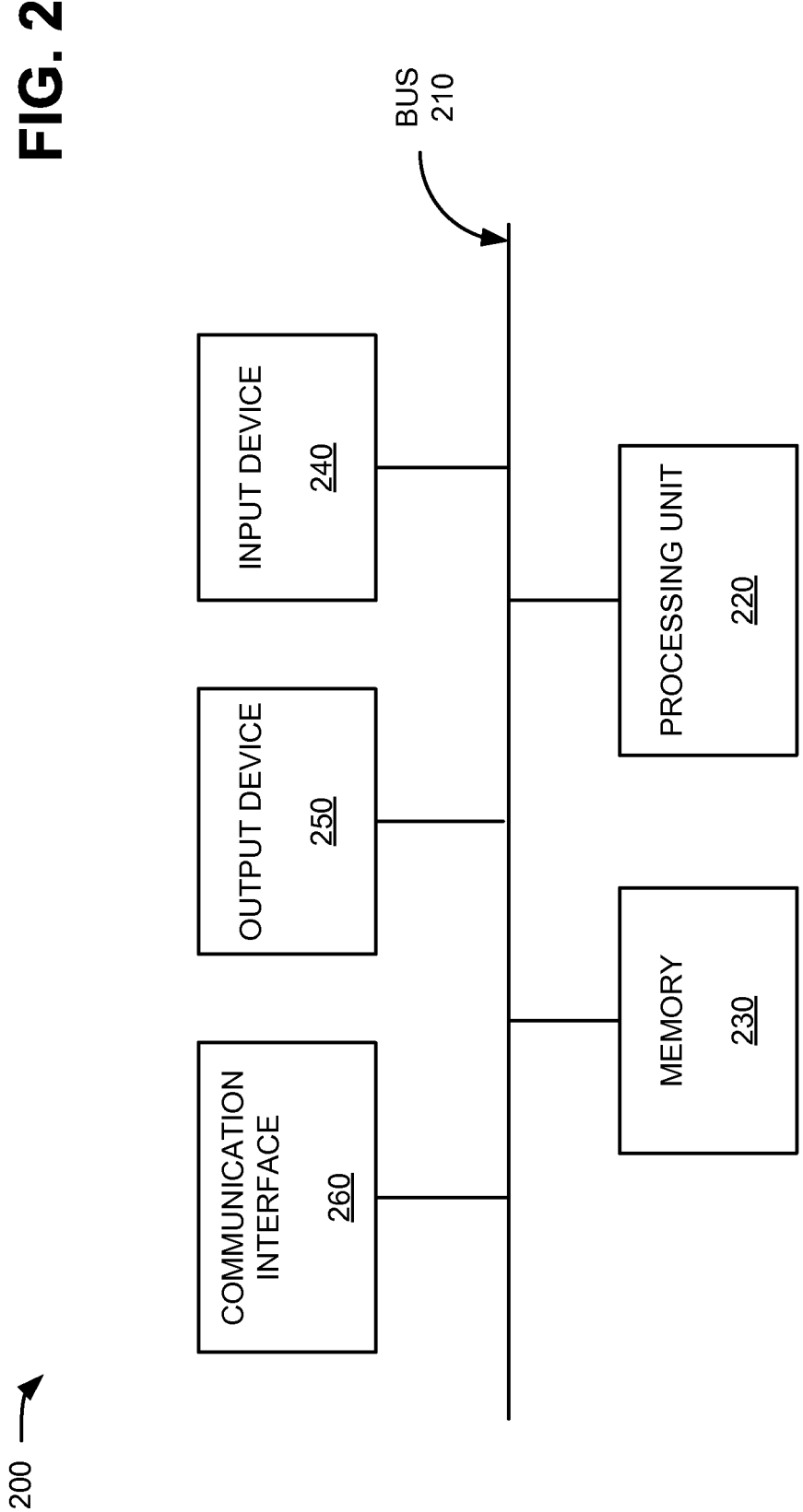
FIG. 2 is a diagram illustrating example components of a device that may correspond to one or more devices depicted in FIG. 1.

FIG. 2 is a diagram of example components of a device 200 that may correspond to user terminal 110. In one implementation, user terminal 110 may include one or more devices 200. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, or the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
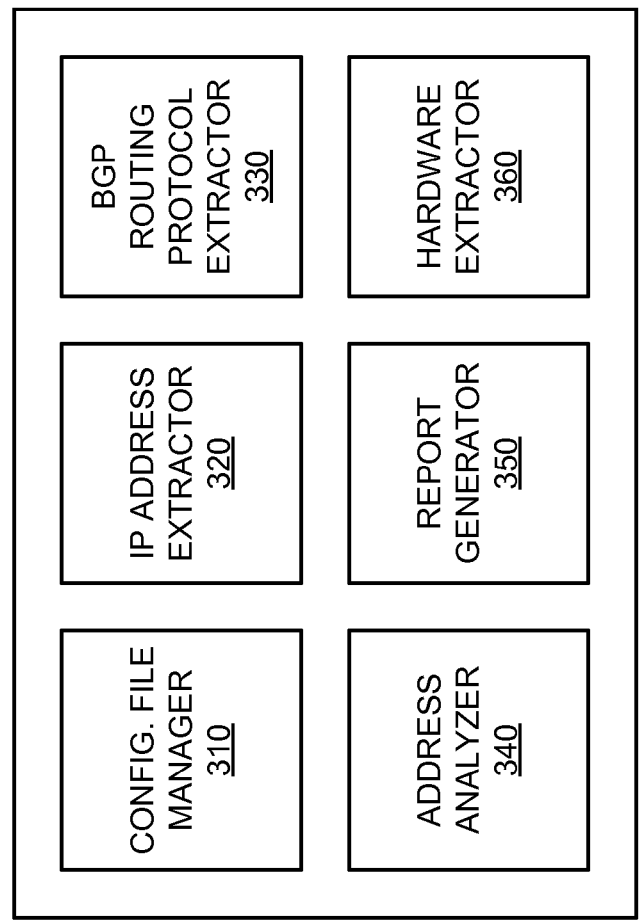
FIG. 3 is a diagram illustrating example functional components that provide for connectivity analysis.

FIG. 3 is a diagram illustrating example functional components (e.g., of user terminal 110) that provide for connectivity analysis. In one implementation, the functions described in connection with FIG. 3 may be performed by one or more components of device 200 (FIG. 2). As shown in FIG. 3, user terminal 110 may include a configuration file manager 310, an IP address extractor 320, a BGP routing protocol extractor 330, an address analyzer 340, a report generator 350, and a hardware extractor 360.

Configuration file manager 310 may include hardware or a combination of hardware and software to receive, convert and/or store configuration files associated with network devices (e.g., devices 130). For example, configuration file manager 310 may receive device configuration files for devices (e.g., devices 130) associated with a network to be analyzed. The device configuration files may be stored, for example, in a dedicated default folder identified by configuration file manager 310 (or otherwise indicated to configuration file storage 310 by a user). Configuration file manager 310 may receive the device configuration files, for example, via a manual transfer (e.g., using portable storage media) or via an automated system including a network interface. For device configuration files that do not conform to a text-based format, configuration file manager 310 may convert the files to a generic text-based format from known information.

IP address extractor 320 may include hardware or a combination of hardware and software to analyze the configuration files and extract IP information from the configuration files. For example, IP address extractor 320 may analyze each configuration file stored by configuration file manager 310. Each device name, interface name, IP address, and associated sub-network (or subnet) masks may be retrieved from each configuration file and populated to a separate field of a database or file. In one implementation, IP address extractor 320 may be configured to analyze network devices employing IPv4 subnets with various operating systems, such as Cisco IOS®, Cisco CatOS®, Juniper JUNOS®, Adtran Operating System (AOS), and Aruba Networks OS.

An example of an IP address data structure 400 that may be generated by IP address extractor 320 is shown in FIG. 4. Data structure 400 may be implemented, for example, in a single database, in multiple databases, or as separate tables. As described further herein, IP address extractor 320 may use multiple copies of IP address data structure 400 (referred to individually as "IP address data structure 400A," "IP address data structure 400B," etc., or generically as "IP address data structure 400") to perform calculations. As shown in FIG. 4, IP address data structure 400 may include a hostname field 410, an interface field 420, an IP address field 430, a mask field 440, and a variety of records or entries 450 associated with fields 410-440.

Hostname field 410 may include a label or device name that is assigned to a device (e.g., device 130) connected to the network to be analyzed by user terminal 110. Interface field 420 may include a label or interface name that is assigned to a type of interface associated with device 130. A device with multiple interfaces may include a separate device name associated with each interface name. IP address field 430 may include an IP address associated with the device identified in hostname field 410. Mask field 440 may include an indication of the size of a routing prefix for the IP address in the corresponding IP address field 430. The size of the routing prefix may be indicated using, for example, classless inter-domain routing (CIDR) notation. Although CIDR notation (e.g., "192.168.1.0/24") is referred to generally herein, in other implementations, a routing prefix may be expressed as a dot-decimal representation (e.g., "255.255.255.0").

Although FIG. 4 shows example information that may be provided in data structure 400, in other implementations, data structure 400 may contain less, different, differently-arranged, or additional information than depicted in FIG. 4.

Returning to FIG. 3, IP address extractor 320 may provide entries 450 for hostname field 410, interface field 420, IP address field 430, and mask field 440 based on data directly listed in the configuration files obtained by configuration file manager 310.

BGP routing protocol extractor 330 may include hardware or a combination of hardware and software to analyze the configuration files and extract BGP information from the configuration files. BGP routing protocol extractor 330 may analyze each configuration file stored by configuration file manager 310. Based on the analysis, BGP routing protocol extractor 330 may identify operational routing protocols. BGP routing protocol extractor 330 may be configured to analyze network devices employing various operating systems, consistent with operating systems supported by IP address extractor 320. Each device name, BGP local autonomous system number (ASN), neighbor IP address, and remote ASN may be retrieved and populated by BGP routing protocol extractor 330 to a separate field of a database or file.

An example of a BGP routing data structure 500 that may be generated by BGP routing protocol extractor 330 is shown in FIG. 5. Data structure 500 may be implemented, for example, in a single database, in multiple databases, or as separate tables. As shown in FIG. 5, BGP routing data structure 500 may include a hostname field 510, a BGP local ASN field 520, a neighbor IP address field 530, a remote ASN field 540, and a variety of records or entries 550 associated with fields 510-540.

Hostname field 510 may include a label or device name that is assigned to a device (e.g., device 130) connected to the network to be analyzed by user terminal 110. BGP local ASN field 520 may include an ASN that uniquely identifies the network/autonomous system number with which the corresponding device name in hostname field 510 is associated. Neighbor IP address field 530 may include an IP address associated with a corresponding device connected to the device identified in hostname field 510. Remote ASN field 540 may include an ASN that uniquely identifies the network with which the corresponding IP address in neighbor IP address field 530 is associated.

Although FIG. 5 shows example information that may be provided in data structure 500, in other implementations, data structure 500 may contain less, different, differently-arranged, or additional information than depicted in FIG. 5.

Returning to FIG. 3, BGP routing protocol extractor 330 may populate data structure 500 with entries 550 for hostname field 510, BGP local ASN field 520, neighbor IP address field 530, and remote ASN field 540 based on data directly listed in the configuration files obtained by configuration file manager 310.

Address analyzer 340 may include hardware or a combination of hardware and software to evaluate data in IP address data structure 400 and BGP routing data structure 500. In one implementation, address analyzer 340 may also supplement IP address data structure 400 and/or BGP routing data structure 500 with additional data. For example, address analyzer 340 may analyze each IP address in IP address data structure 400. In one implementation, as described further herein, address analyzer 340 may analyze devices in IP address data structure 400 based on subnet mask types and may provide supplemental information to generate a supplemented IP address data structure.

An example supplemented IP data structure 600 that may be generated by address analyzer 340 is shown in FIG. 6 and described further below. As shown in FIG. 6, supplemented IP address data structure 600 may include hostname field 410, interface field 420, IP address field 430, mask field 440, first remote host field 610, first remote interface field 620, and first remote IP address field 630. Hostname field 410, interface field 420, IP address field 430, and mask field 440 may include features described above in connection with, for example, FIG. 4.

First remote host field 610 may include a label or device name that is assigned to a corresponding device connected to the device identified in hostname field 410. Similarly, first remote interface field 620 may include an IP address associated with the corresponding device identified in remote host field 610, and first remote IP address field 630 may include an IP address associated with the device identified in first remote host field 610. Additional fields (not shown) may include device names, interface types, and IP addresses for other devices connected to the corresponding device identified in hostname field 410. For example, if a local device is found to have remote connectivity with more than one remote device, additional sets of remote host fields, remote interface fields, and remote IP address fields may be included, within supplemented IP address data structure 600, for each additional remote device.

Although FIG. 6 shows example information that may be provided in data structure 600, in other implementations, data structure 600 may contain less, different, differently-arranged, or additional information than depicted in FIG. 6.

Returning to FIG. 3, when address analyzer 340 identifies a subnet mask of /32 or /0 in mask field 440 of IP address data structure 400, address analyzer 340 may associate the corresponding device (e.g., in hostname field 410) with self-connectivity. As shown in FIG. 6, address analyzer 340 may update supplemented IP address data structure 600 with a self-connectivity (e.g., by adding a "SELF" entry to first remote host field 610, first remote interface field 620, and first remote IP address field 630 of data structure 400), as indicated by reference number 640.

When address analyzer 340 identifies a subnet mask of /30 or /31 in mask field 440 of IP address data structure 400, address analyzer 340 may calculate a remote IP address. In one implementation, address analyzer 340 may search all sites (e.g., a table of all IP addresses) to verify the calculated remote IP address. For example, address analyzer 340 may apply a binary search algorithm to an ordered array of previously extracted IP addresses to quickly match the calculated address to a previously extracted IP address known within the set of configurations. If a directly connected device is found, the remote hostname, the remote interface name, and the remote IP address may be appended to the corresponding first remote host field 610, first remote interface field 620, and first remote IP address field 630 of supplemented IP address data structure 600. For example, as indicated by reference number 650 of FIG. 6, address analyzer 340 may append, to entries for a device having a hostname "ashburn-wan-rtr2" (e.g., in hostname field 410) with a mask of "/30" (e.g., in mask field 440), entries of "ashburn-core-esw2", "GigabitEthernet5/8", and "10.xxx.255.78".

If the search for all sites does not find a directly connected device, each subnet for the device may be compared to known IP addresses (e.g., publically registered IP addresses or known private IP addresses such as addressing defined within IETF RFC 1918 and known to be used for carrier WAN connectivity) of service providers, such as Verizon®, AT&T®, Sprint®, British Telecom®, etc. When an IP address is found on a service provider's IP addressing subnet, the remote device may be labeled as a carrier WAN interface. For example, as indicated by reference number 660 of FIG. 6, address analyzer 340 may append, to entries for a device having a hostname "chespotrtr0001" (e.g., in hostname field 410) with a mask of "/30" (e.g., in mask field 440), entries "ATTWAN", "CARRIER PE INT", and "10.XXX.101.33" in first remote host field 610, first remote interface field 620, and first remote IP address field 630, respectively, of supplemented IP address data structure 600.

If the search for all sites does not find a directly connected device and no match with a service provider's IP address is found, address analyzer 340 may search for matches based on a BGP remote ASN. More particularly, address analyzer 340 may open BGP routing data structure 500 and may search for the calculated remote IP address within BGP routing data structure 500. If there is a match in BGP routing data structure 500 and if the corresponding remote ASN found in BGP routing data structure 500 is that of a known service provider, the interface may be labeled as being directly connected to the WAN carrier. For example, as indicated by reference number 670 of FIG. 6, address analyzer 340 may append, to entries for a device having a hostname "chespotrtr0201" (e.g., in hostname field 410) with a mask of "/30" (e.g., in mask field 440), entries "ATTWAN", "CARRIER PE INT", and "10.xxx.101.57" in first remote host field 610, first remote interface field 620, and first remote IP address field 630, respectively, of supplemented IP address data structure 600.

When address analyzer 340 identifies a subnet mask of less than /30 and more than /0 in mask field 440 of IP address data structure 400, address analyzer 340 may calculate a network number (e.g., the first number of an IP subnet) and a broadcast address (e.g., the last number of an IP subnet) for a pairing defined by the IP address in IP address field 430 and the subnet mask in mask field 440. More particularly, address analyzer 340 may determine if a device is directly connected when the calculated network number, calculated broadcast address and subnet mask are all equal and the IP address configured on the subject device is not equal. A duplicate copy of data structure 400 may be created for search purposes. For purposes of this description, one copy of data structure 400 will be referred to as data structure 400A and another copy of data structure 400 will be referred to as data structure 400B. The above calculation may be applied to all extracted IP address and subnet mask pairs defined within data structure 400A and data structure 400B. For example:

Row 1 of data structure 400A and its associated data will be compared to Row 1 of data structure 400B;

Row 1 of data structure 400A and its associated data will be compared to Row 2 of data structure 400B;

Row 1 of data structure 400A and its associated data will be compared to Row 3 of data structure 400B; and so forth.

The above pattern may be repeated for each row of database 400A.

When a direct connection is determined based on the comparison of data structure 400A and data structure 400B described above, address analyzer 340 may update supplemented IP address data structure 600 to include the additional information. For example, as indicated by reference number 680 of FIG. 6, address analyzer 340 may append, to entries for a device having a hostname "ashburn-gk1" (e.g., in hostname field 410) with a mask of "/24" (e.g., in mask field 440), entries "ashburn-core-esw2", "Vlan200", and "172.xx.162.2" in first remote host field 610, first remote interface field 620, and first remote IP address field 630, respectively, of supplemented IP address data structure 600.

If analysis of the IP addresses and subnet masks in IP address data structure 400 fails to identify a connection for a particular device, address analyzer 340 may leave blank corresponding field entries, in supplemented IP address data structure 600, for first remote host field 610, first remote interface field 620, and first remote IP address field 630, as indicted by reference number 690.

Returning to FIG. 3, report generator 350 may include hardware or a combination of hardware and software to generate a particular file or a series of files upon selection by a user of a network analysis feature. Report generator may retrieve information from one or more files and/or data structures of configuration file manager 310, IP address extractor 320, BGP routing protocol extractor 330, address analyzer 340, and/or hardware extractor 360. For example, a user of user terminal 110 may select from a menu of available reports. Reports may be generated, for example, as text-based output files, spreadsheets, or another file format.

Output files available for selection from report generator 350 may include, for example, all extracted local and remote BGP ASNs; all calculated and identified device connectivity; all extracted Cisco router-based dynamic host configuration protocol (DHCP) server configurations per device; indications of particular features, such as Appletalk, DECnet, Dial-Peers, data link switching (DLSw), internetwork packet exchange (IPX), CryptoKeys, CryptoMaps, and Synchronous Data Link Control (SDLC) (e.g., each marked as "detected" or "not detected"); all configured IP helper addresses; all IP routing protocols configured; extracted Cisco-based ISDN basic rate interface (BRI) service profile ID (SPID) numbers per device, per interface; all identified multi-protocol label switching (MPLS) WAN links per device, per interface; detailed IP multicast configurations per device; all extracted quality-of-service (QoS) policies per device, per interface; all configured static routes; and all subnets configured and identified within the configurations. In another implementation, report generator 350 may also provide automatically-generated WAN and/or LAN connectivity diagrams. In still another implementation, report generator 350 may include a "find" feature that permits a user to search for particular terms and/or devices of one or more files and/or data structures of configuration file manager 310, IP address extractor 320, BGP routing protocol extractor 330, address analyzer 340, and/or hardware extractor 360.

Hardware extractor 360 may include hardware or a combination of hardware and software to collect additional device information from configuration files (e.g., the configuration files for each of devices 130 within network 120). For example, hardware extractor 360 may scan each device configuration file for "show version" and/or detailed device hardware information output. Hardware extractor 360 may generate a separate data structure (e.g., database) of the additional device information, such as device manufacturer, model, serial number, operating system (OS), OS version, and feature set per device. In one implementation, the data set may be used by report generator 350 to, for example, generate connectivity analysis reports that are supplemented with device information.

Although FIG. 3 shows example functional components of user terminal 110, in other implementations, user terminal 110 may include fewer functional components, different functional components, differently arranged functional components, and/or additional functional components than depicted in FIG. 3. Alternatively, or additionally, one or more functional components of user terminal 110 may perform one or more other tasks described as being performed by one or more other functional components of device 110.

FIGS. 7A-7D are flow charts of an example process 700 for performing connectivity analysis according to an implementation described herein. Process 700 may be performed by user terminal 110. In another implementation, some or all of process 700 may be performed by one or more other devices including or excluding user terminal 110.

Process 700 may include receiving configuration files associated with a network (block 702) and converting the configuration files to a text-based format (block 704). For example, user terminal 110 may receive device configuration files for devices (e.g., devices 130) associated with a network (e.g., network 120) to be analyzed. The device configuration files may be stored, for example, in a dedicated folder identified by configuration file manager 310. User terminal 110 may receive the device configuration files, for example, as a manual transfer (e.g., using portable storage media) or via an automated system including a network interface. For device configuration files that do not conform to a text-based format, user terminal 110 may convert the files to a generic text-based format from known information.

Process 700 may include extracting IP address information from the configuration files to form an IP address database (block 706) and extracting BGP routing protocols from the configuration files to form a BGP routing database (block 708). For example, user terminal 110 (e.g., IP address extractor 320) may analyze each configuration file stored by configuration file manager 310. Each device name, interface name, IP address, and associated sub-network (or subnet) masks may be retrieved and populated to a separate field of a database or file. In one implementation, IP address extractor 320 may be configured to analyze network devices employing various operating systems, such as Cisco IOS®, Cisco CatOS®, Juniper JUNOS®, Adtran Operating System (AOS), and Aruba Networks OS. User terminal 110 (e.g., BGP routing protocol extractor 330) may analyze each configuration file stored by configuration file manager 310. Routing protocols in operation may be identified. Each device name, BGP local ASN, neighbor IP address, and remote ASN may be retrieved and populated to a separate field of a database or file.

Process 700 may include analyzing address in the IP address database based on subnet type (block 710). For example, user terminal 110 (e.g., address analyzer 340) may sort subnet masks included in IP address data structure 400 and analyze different categories of subnet masks. Address analyzer 340 may also supplement IP address data structure 400 and/or BGP routing data structure 500 with additional data. For example, address analyzer 340 may analyze each IP address in IP address data structure 400 and add supplemental information regarding calculated device connections.

Figure 7B:
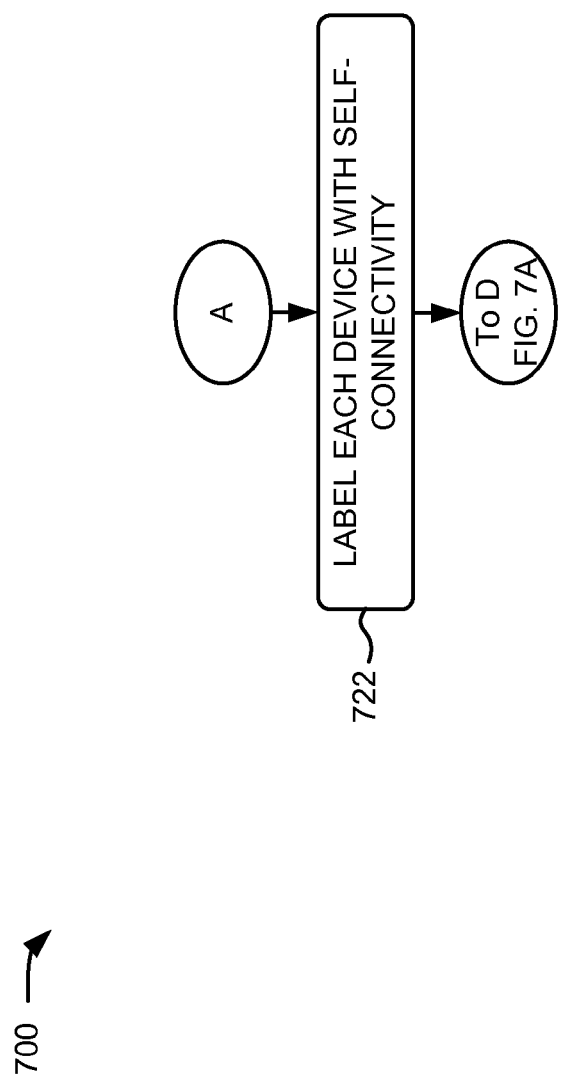
Figure 7C:
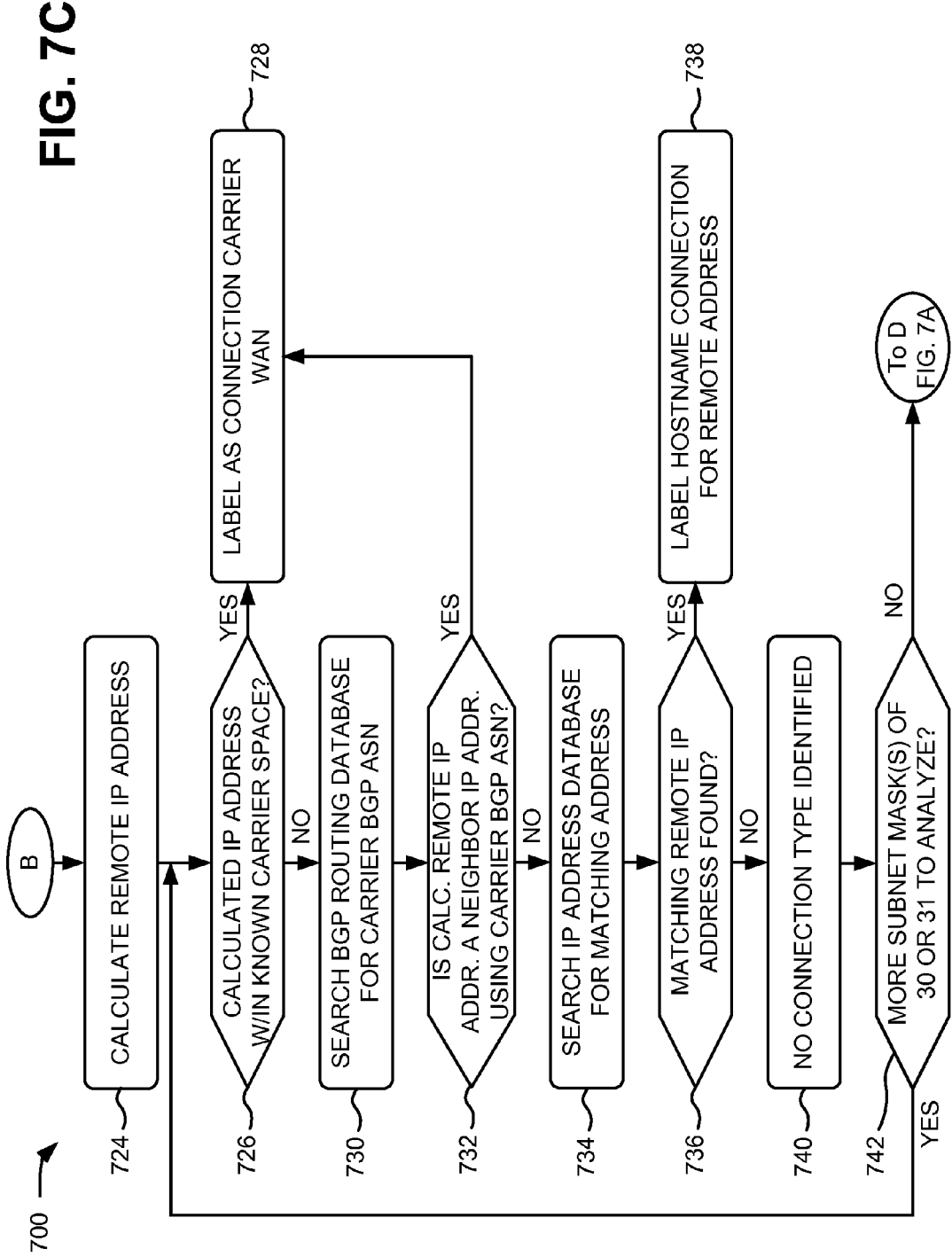

If the subnet mask of one or more addresses in the IP address database is either /0 or /32 (block 712—YES), process 700 may include the process blocks shown in FIG. 7B described below. Otherwise, the process may proceed to block 714. If the subnet mask of one or more addresses in the IP address database is either /30 or /31 (block 714—YES), process 700 may include the process blocks shown in FIG. 7C described below. Otherwise the process may proceed to process block 716. If the subnet mask of one or more addresses in the IP address database is greater than 0 but less than 30 (block 716—YES), process 700 may include the process blocks shown in FIG. 7C described below.

Referring to 7B, if the subnet mask of one or more addresses in the IP address database is either /0 or /32 (e.g., block 712—YES of FIG. 7A), each associated device may be labeled with self connectivity (block 722), and process 700 may return to point D of FIG. 7A. For example, as described above in connection with FIG. 3, user terminal 110 (e.g., address analyzer 340) may analyze each IP address in IP address data structure 400. When address analyzer 340 identifies a subnet mask of /32 or /0 in mask field 440 of IP address data structure 400, address analyzer 340 may associate the corresponding device (e.g., in hostname field 410) with self-connectivity. As shown in FIG. 6, address analyzer 340 may update supplemented IP address data structure 600 with a self-connectivity, as indicated by reference number 640.

Referring to 7C, if the subnet mask of one or more addresses in the IP address database is either /30 or /31 (e.g., block 714—YES of FIG. 7A), a remote IP address may be calculated (block 724), and, if the calculated IP address is within a known carrier space (block 726—YES), the remote address may be labeled as a carrier WAN (block 728). For example, address analyzer 340 may calculate a remote IP address for each device with a subnet of /30 or /31. Each subnet for the corresponding remote device may be compared to known IP addresses of service providers (e.g., registered addresses or known private addresses). When an IP address is found on a service provider's IP addressing subnet, the remote device may be labeled as a carrier WAN interface (e.g., as shown in entry 660 of FIG. 6).

If the calculated IP address is not within a known carrier space (block 726—NO), the BGP routing database may be searched for a matching carrier BGP ASN (block 730), and, if the calculated IP address is a neighbor of a carrier BGP ASN (block 732—YES), the remote address may be labeled as a carrier WAN (block 728). For example, if the search for all sites does not find a directly connected device and no match with a service provider's registered IP address is found, address analyzer 340 may search for matches based on a BGP remote ASN. More particularly, address analyzer 340 may open BGP routing data structure 500 and may search for the calculated remote IP address within BGP routing data structure 500. If there is a match in BGP routing data structure 500 and if the corresponding remote ASN found in BGP routing data structure 500 is that of a known service provider, the interface may be labeled as being directly connected to the WAN carrier.

If the calculated IP address is not a neighbor of a carrier BGP ASN (block 732—NO), the IP database may be searched for a matching IP address (block 734), and, if a matching remote IP address is found (block 736—YES), the remote address may be labeled with a hostname (block 738). For example, address analyzer 340 may apply a binary search algorithm and search all sites in the IP database to verify the calculated remote IP address. If a directly connected device is found, the remote hostname, remote interface name, and the remote IP address may be appended to the corresponding first remote host field 610, first remote interface field 620, and first remote IP address field 630 of supplemented IP address data structure 600.

If a matching remote IP address is not found (block 736—NO), no connection type for the calculated IP address may be determined (block 740). For example, address analyzer 340 may leave blank first remote host field 610, first remote interface field 620, and first remote IP address field 630 of supplemented IP address data structure 600.

If there are other devices with subnet masks of /30 or /31 to analyze (block 742—YES), process 700 may repeat from block 726. If there are no other remote devices with subnet masks of /30 or /31 to analyze (block 742—NO), process 700 may return to point D of FIG. 7A.

Referring to 7D, if the subnet mask of one or more addresses in the IP address database is greater than 0 but less than 30 (e.g., block 716—YES of FIG. 7A), a network number and broadcast address for the IP address subnet mask pair may be calculated (block 744), and the IP address database may be searched for a matching mask, network number, and/or broadcast address (block 746). For example, when address analyzer 340 identifies a subnet mask of less than /30 and more than /0 in mask field 440 of IP address database 400, address analyzer 340 may calculate a network number (e.g., the first number of the IP subnet) and a broadcast address (e.g., a last number of the IP subnet) for the remote IP address, subnet mask pair associated with a local device. Address analyzer 340 may search each address in IP address database 400.

If a matching subnet mask is found (block 748—YES), if a matching network number is found (block 750—YES), if a matching broadcast address is found (block 752—YES), and if the calculated IP address does not equal an IP address in the IP address database (block 754—NO), a connection may be identified and remote hostname, remote interface name, and remote IP address field may be populated (block 756). For example, address analyzer 340 may compare the calculated network number and broadcast address for one of the remote IP addresses with each sites in IP database 400. When the subnet mask, network number, and broadcast address are equal and the IP address is not, the device may be identified as directly connected. If a directly connected device is found, the remote hostname, remote interface name, and the remote IP address may be appended to, for example, the corresponding first remote host field 610, first remote interface field 620, and first remote IP address field 630 of supplemented IP address data structure 600.

If a matching subnet mask is not found (block 748—NO), if a matching network number is not found (block 750—NO), if a matching broadcast address is not found (block 752—NO), or if the calculated IP address equals an IP address in the IP address database (block 754—NO), process 700 may include determining if there are other devices with subnet masks of greater than /0 and less than /30 to analyze (block 758). For example, if any of the subnet mask, network number, and broadcast address are not equal, or the IP address is equal, a connection type for the device may not be determined and address analyzer 340 may proceed to analyze another address, if necessary.

If there are other devices with subnet masks greater than /0 and less than /30 to analyze (block 758—YES), process 700 may return to block 744 to calculate a network number and broadcast address for another of the remote IP addresses. If there are no other devices with subnet masks greater than /0 and less than /30 to analyze (block 758—NO), process 700 may return to point D of FIG. 7A.

Returning to FIG. 7A, process 700 may include building a final database (block 718). For example, user terminal 110 (e.g., address analyzer 340) may compile the analysis of the IP database 400 to form supplemented IP address data structure 600. Additionally, in one implementation, user terminal 110 may compile other routing protocol information, such as QoS policies and/or hardware information, collected (e.g., by hardware extractor 360) from the configuration files, to associate with each network device.

Process 700 may include generating one or more output files (block 720). For example, user terminal 110 (e.g., report generator 350) may generate a particular file or a series of files upon a network analysis selection. For example, a user of user terminal 110 may select from a menu of available reports. Reports may be generated, for example, as text-based output files, spreadsheets, or another file format. Output files available for selection may include, for example, all extracted local and remote BGP ASNs; all calculated and identified device connectivity; per interface; all identified MPLS WAN links per device, per interface; detailed IP multicast configurations per device; all extracted QoS policies per device, per interface; all configured static routes; and all subnets configured and identified within the configurations. In another implementation, report generator 350 may provide WAN and/or LAN diagrams.

Systems and/or methods described herein may retrieve a set of configuration files of devices associated with a network to be analyzed and may extract, from the set of configuration files, IP address information to form an IP address database. The systems and/or methods may extract, from the set of configuration files, BGP routing protocols to form a BGP routing database. The systems and/or methods may analyze the IP address database and the BGP routing database to determine network connection information for each of the devices associated with the network and may generate an output file including the network connection information for each of the devices associated with the network. The network connection information may be determined without establishing a connection between a device performing the connectivity analysis and the devices associated with the network.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7A-7D, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device, multiple configuration files of devices associated with a network;
   extracting, by the computing device and from the multiple configuration files, Internet protocol (IP) address information to form an IP address database;
   extracting, by the computing device and from the multiple configuration files, border gateway protocol (BGP) routing protocols to form a BGP routing database that is different from the IP address database;
   analyzing, by the computing device, IP addresses in the IP address database and autonomous system numbers (ASNs) in the BGP routing database to determine network connection information for each of the devices associated with the network, wherein the computing device performs a different analysis based on a type of subnet mask associated with each IP address, and wherein the network connection information is determined without network connectivity between the computing device and the devices associated with the network; and generating, by the computing device, an output file that includes the network connection information for each of the devices associated with the network.

2. The method of claim 1, further comprising:
converting one or more of the multiple configuration files from a non-text-based format into a text-based format.

3. The method of claim 1, where the network is one of a wide area network (WAN) or a local area network (LAN).

4. The method of claim 3, where the output file includes one or more of:
a network diagram of the network,
local and remote BGP autonomous system numbers (ASNs) for each of the devices associated with the network,
device connectivity for each of the devices associated with the network, or
IP routing protocols associated with the network.

5. The method of claim 1, where analyzing IP addresses in the IP address database and ASNs in the BGP routing database to determine network connection information for each of the devices associated with the network comprises:
creating duplicate copies of the IP address database, and
comparing the duplicate copies to determine if a device is directly connected to another device in the IP address database.

6. The method of claim 1, where analyzing IP addresses in the IP address database and ASNs in the BGP routing database to determine network connection information for each of the devices associated with the network comprises:
identifying self connectivity for subnet masks in the IP address database,
calculating a remote IP address for subnet masks of /30 and /31 in the IP address database, and
for an IP address/subnet mask pair for any subnets with a subnet mask of /1 through /29, calculating a network number and broadcast address and searching the IP address database for direct IP connectivity based on defined algorithms.

7. The method of claim 6, where the computing device employs a binary search algorithm to identify a registered IP address that matches one of the calculated remote IP addresses for subnet masks of /30 and /31 in the IP address database.

8. The method of claim 1, further comprising:
generating, based on the analyzing, a data file that includes the IP address database and the network connection information for each of the devices associated with the network; and
storing, in a memory of the computing device, the data file.

9. A device, comprising:
a memory to store:
a plurality of instructions, and
multiple configuration files of devices associated with a network; and
a processor to execute instructions in the memory to:
retrieve, from the memory, the multiple configuration files of devices associated with a network,
extract, from the multiple configuration files, Internet protocol (IP) address information to form an IP address database,
extract, from the multiple configuration files, border gateway protocol (BGP) routing protocols to form a BGP routing database,
analyze IP addresses in the IP address database and autonomous system numbers (ASNs) in the BGP routing database to determine network connection information for each of the devices associated with the network, wherein the computing device performs a different analysis based on a type of subnet mask associated with each IP address, and
generate an output file that includes the network connection information for each of the devices associated with the network.

10. The device of claim 9, where the processor is further to execute instructions to:
convert one or more of the multiple configuration files from a non-text-based format into a text-based format.

11. The device of claim 9, where the network is one of a wide area network (WAN) or a local area network (LAN).

12. The device of claim 9, where the output file includes one or more of:
a network diagram of the network,
local and remote BGP autonomous system numbers (ASNs) for each of the devices associated with the network,
device connectivity for each of the devices associated with the network,
IP routing protocols associated with the network,
a listing of multi-protocol label switching (MPLS) WAN links for each of the devices associated with the network, per interface,
IP multicast configurations for each of the devices associated with the network, or
quality-of-service (QoS) policies for each of the devices associated with the network, per interface.

13. The device of claim 9, where, when analyzing IP addresses in the IP address database, the processor is further to execute instructions to:
create duplicate copies of the IP address database, and
compare the duplicate copies to determine if a device is directly connected to another device in the IP address database.

14. The device of claim 9, where, when analyzing IP addresses in the IP database, the processor is further to execute instructions to:
identify self connectivity for subnet masks in the IP address database,
calculate a remote IP address for subnet masks of /30 and /31 in the IP address database, and
calculate a network number and a broadcast address for subnet masks of /1 through /29 in the IP address database and search for matches within the IP address database.

15. The device of claim 14, where the processor is further to execute instructions to:
employ a binary search algorithm to identify a registered IP address that matches one of the calculated remote IP address for subnet masks of /30 and /31 in the IP address database.

16. The device of claim 9, where the device is not connected to the devices associated with the network.

17. The device of claim 9, where the processor is further to execute instructions to:
store, in the memory, the IP address database, the BGP routing database, and the output file.

18. A non-transitory computer-readable medium that includes instructions for execution by one or more processors, the computer-readable medium comprising:
- one or more instructions to extract, from a set of configuration files of devices associated with a network, Internet protocol (IP) address information to form an IP address database,
- one or more instructions to extract, from the set of configuration files, border gateway protocol (BGP) routing protocols to form a BGP routing database,
- one or more instructions to analyze IP addresses in the IP address database and autonomous system numbers (ASNs) in the BGP routing database to determine network connection information for each of the devices associated with the network, wherein the computing device performs a different analysis based on a type of subnet mask associated with each IP address, and
- one or more instructions to generate an output file including the network connection information for each of the devices associated with the network.

19. The non-transitory computer-readable medium of claim 18, where the network connection information is determined without a connection between the one or more processors and the devices associated with the network.

20. The non-transitory computer-readable medium of claim 18, further comprising:
- one or more instructions to store in a memory, the set of configuration files, and
- one or more instructions to retrieve, from the memory, the set of configuration files.

* * * * *